United States Patent [19]

Io et al.

[11] Patent Number: 5,131,485
[45] Date of Patent: Jul. 21, 1992

[54] STEERING APPARATUS FOR STEERING REAR WHEELS OF AUTOMOTIVE VEHICLE

[75] Inventors: Shinichi Io; Sachihito Ohnishi; Minoru Suzuki; Toshiro Ichikawa, all of Kanagawa, Japan

[73] Assignee: Atsugi Unisia Corp., Japan

[21] Appl. No.: 598,029

[22] Filed: Oct. 16, 1990

[30] Foreign Application Priority Data

Oct. 24, 1989 [JP] Japan .................................. 1-275019

[51] Int. Cl.$^5$ ............................................. B62D 5/04
[52] U.S. Cl. .................................... 180/79.1; 74/104; 74/497; 280/91
[58] Field of Search ..................... 180/79.1, 140, 141, 180/143; 280/91; 74/497, 104

[56] References Cited

U.S. PATENT DOCUMENTS

| 3,596,730 | 8/1971 | Cecce | 280/91 |
| 4,570,734 | 2/1986 | Taig | 180/79.1 |
| 4,653,602 | 3/1987 | Anders et al. | 180/79.1 |
| 4,874,183 | 10/1989 | Chikuma et al. | 280/91 |
| 4,949,803 | 8/1990 | Janson et al. | 180/140 |
| 5,078,018 | 1/1992 | Saita et al. | 180/79.1 |

FOREIGN PATENT DOCUMENTS 63-207773 8/1988 Japan .

Primary Examiner—Kenneth R. Rice
Assistant Examiner—A. M. Boehler
Attorney, Agent, or Firm—Ronald P. Kananen

[57] ABSTRACT

An apparatus for steering rear wheels of a four-wheel steering vehicle is provided. This apparatus includes a first housing which has an operating rod displaceable along the longitudinal center line thereof for steering the rear wheels, a second housing which has a cam rotatably supported thereby for displacing the operating rod in a desired direction, a movable block engaging with the cam, and a stationary block mounted on the operating rod. The movable block moves along a guide rod provided in the second housing according to rotation of the cam. The stationary block transmits the movement of the movable block to the operating rod at a first angular position between the guide rod and the operating rod and blocks the transmission of the movement of the movable block at a second angular position different from the first position.

10 Claims, 5 Drawing Sheets

STEERING APPARATUS FOR STEERING REAR WHEELS OF AUTOMOTIVE VEHICLE

BACKGROUND OF THE INVENTION

1. Technical Field

The present invention relates generally to a steering apparatus for steering rear wheels of an automotive vehicle. More particularly, the invention relates to an improved steering apparatus which has a variable maximum steering angle for rear wheels dependent upon a vehicle speed.

2. Background Art

Various types of steering actuators for rear wheels have been proposed. Japanese Patent First Publication No. 63-207773 discloses a steering actuator which includes a single electric motor and a ball screw mechanism wherein the electric motor is driven according to a steered angle of front wheels to steer the rear wheels by a preselected angle.

The prior art steering actuator having a signal motor is operable to control a rotational angle and a rotational direction of the motor so as to provide a steering direction and a steering angle for rear wheels according to a vehicle speed and a steered angle of front wheels which are electronically monitored by sensors. This system requires highly precise control because the front and rear wheels are not mechanically communicated with each other to steer the rear wheels independently. Thus over-running of the motor due to malfunction of a control system sometimes causes unanticipated vehicle behavior. For example, steering the rear wheels at a maximum steering angle while the vehicle runs at high speed may induce the wheels to spin, resulting in unstable cornering.

SUMMARY OF THE INVENTION

It is accordingly one object of the present invention to avoid the disadvantages of the prior art.

It is another object of the invention to provide a steering apparatus for steering rear wheels of a four-wheel steering (4WS) vehicle which restricts a maximum steering angle for rear wheels mechanically, dependent upon a vehicle speed.

According to one aspect of the present invention, there is provided an apparatus for steering wheels of an automotive vehicle which comprises a first means including an operating rod displaceable along the longitudinal center line thereof for steering the wheels, a second means including cam means which rotates by a preselected angle for displacing the operating rod in a desired direction, and a third means, connecting between the cam means and the operating rod, movable along a linear path of travel according to rotation of the cam means for causing the operating rod to be moved by a displacement defined by an angular positional relation between the linear path of travel and the operating rod.

According to another aspect of the present invention there is provided an apparatus for steering rear wheels of an automotive vehicle which comprises a first means including an operating rod displaceable along the longitudinal center line thereof for steering the rear wheels, a second means including cam means which rotates by a preselected direction for displacing the operating rod in a desired direction, a third means for rotating the cam means by a preselected angle, a fourth means movable along a linear path of travel provided by the second means according to the rotation of the cam means for converting rotational motion of the cam means into linear motion to move the operating rod by a displacement defined by an angular position between the linear path of travel and the operating rod, and a fifth means for shifting the angular position between the linear path of travel and the operating rod so as to vary the displacement of the operating rod.

According to a further aspect of the invention, there is provided an apparatus for steering rear wheels of an automotive vehicle which comprises a first housing in which an operating rod is disposed, slidable along a longitudinal center line thereof for steering the rear wheels, a second housing in which cam means are provided rotatably for displacing the operating rod in a desired direction, a first driving means for rotating the cam means by a preselected angle, a second driving means for rotating the second housing relative to the first housing according to a vehicle speed, and a means for displacing the operating rod according to rotation of the cam means by a distance defined by an angular position between the first and second housings.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

DESCRIPTION OF THE PREFERRED EMBODIMENT

Figure 1:
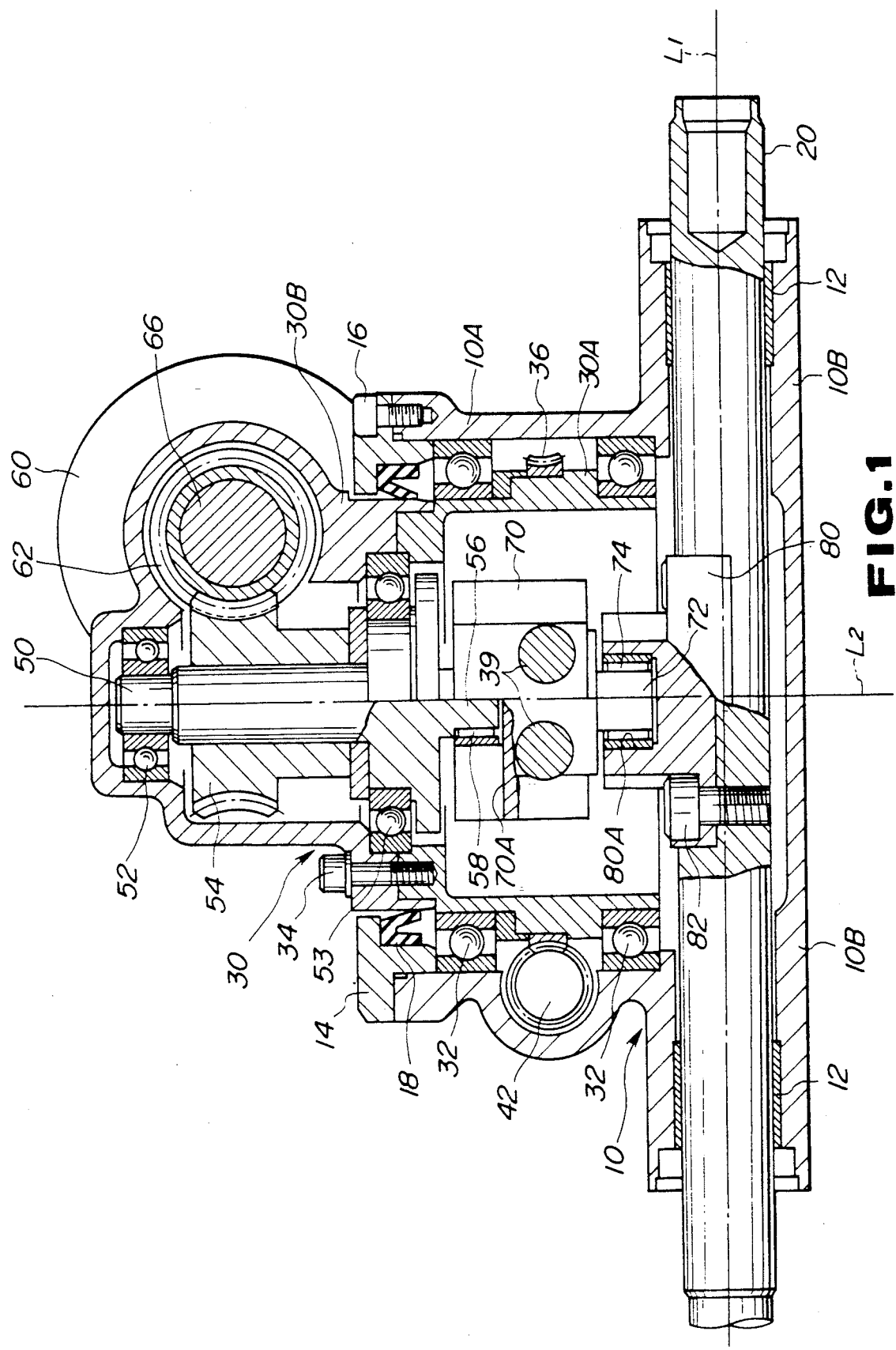
FIG. 1 is a cross-sectional view which shows a steering actuator according to the present invention.
Figure 2:
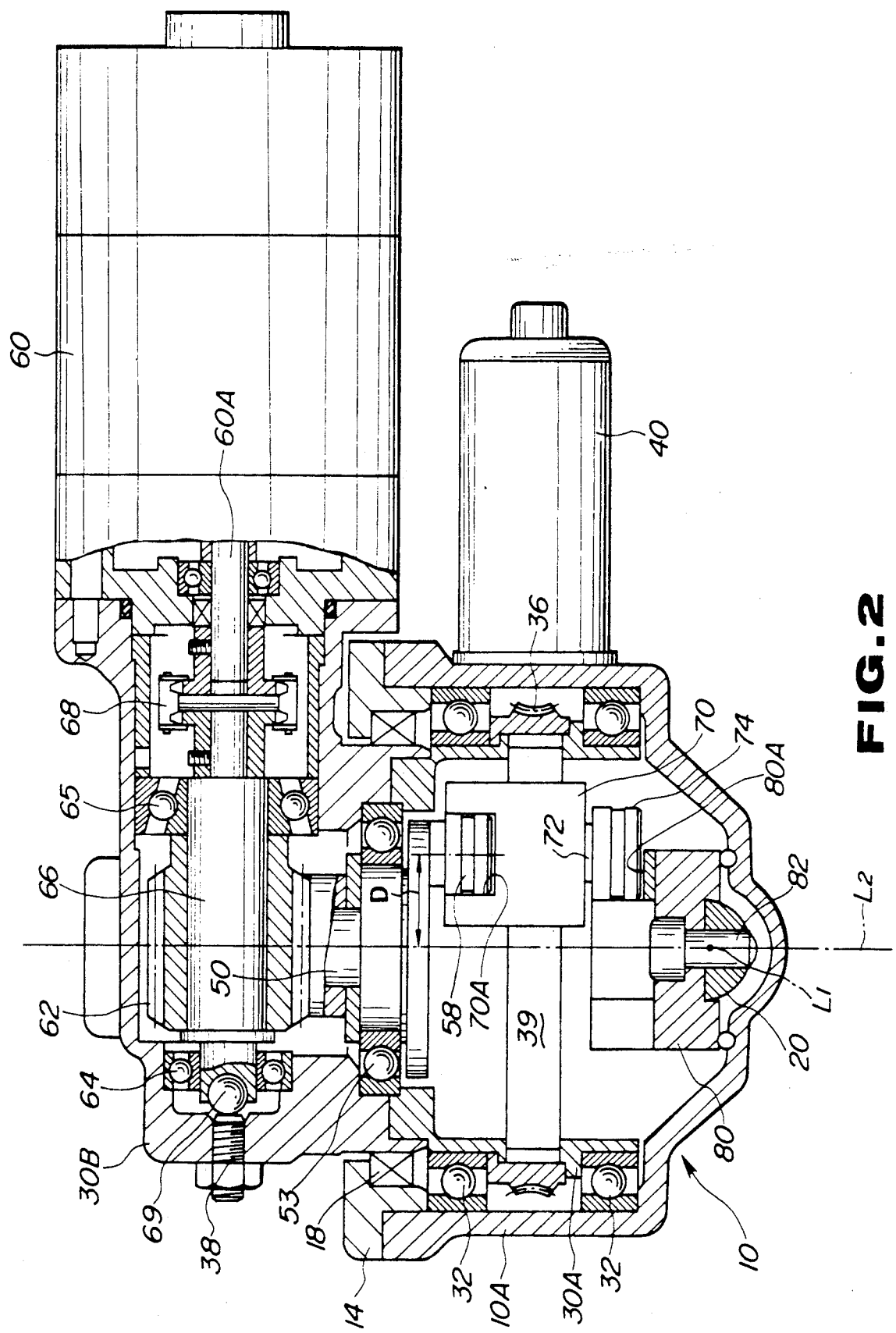
FIG. 2 is a side cross-sectional view of FIG. 1.

Referring now to the drawings, wherein like numbers refer to like parts in several views, particularly to FIGS. 1 and 2, a steering actuator is shown which is applicable to rear-wheel steering control system for an automotive vehicle. This actuator includes generally a first housing 10 attached to a vehicle body (not shown) and a second housing 30 separate from the first housing. The first housing 10 includes an upper cylindrical member 10A and a lower cylindrical member 10B extending horizontally at the bottom of the upper cylindrical member. The lower cylindrical member 10B supports an operating rod 20 through bearings 12 slidably along the center line $L_1$ thereof. Both ends of the operating rod 20 are connected to tie rods via ball joints (not shown) to steer rear wheels. The second housing 30 is supported by the upper cylindrical member 10A of the first housing 10 through bearings 32 rotatable around the center line $L_2$ which is perpendicular to center line $L_1$. The second housing 30 is provided with a lower cylindrical member 30 A and an upper cylindrical member 30B separate from each other, which are connected together by a bolt 34. An annular flange 14 is disposed on an upper end of the upper cylindrical member 10A of the first housing 10 by a bolt 16 and retains a seal ring 18 to seal a gap defined between the first and second housings 10 and 30.

A ring-shaped worm wheel 36 is attached to an outer peripheral surface of the lower housing 30A of the second housing 30 by press fitting and meshes with a worm pinion 42 which is driven by a second motor 40 mounted on the first housing 10.

A cam shaft 50 is disposed within the second housing 30 through bearings 52 and 53 to be rotatable about the center line $L_2$. A worm wheel 54 is fitted on an outer peripheral surface of the cam shaft 50. The worm wheel 54 is driven through a worm pinion 62 by a first motor 60 provided on the second housing 30. An eccentric pin 56 is provided on a lower end of the cam shaft 50 away from the center line $L_2$ by a distance D (see FIGS. 2 to 5) engaging with a movable block as will be described hereinafter. The worm pinion 62, as shown in FIG. 2, is press fitted on a shaft 66 which is rotatably supported by the upper housing 30B of the second housing 30 through bearings 64 and 65. The shaft 66 is connected to an output shaft 60A of the first motor 60 through a chain type coupling 68.

Formed in an end of the shaft 66 is a recessed portion into which a ball 69 is partially inserted. An adjusting bolt engaged with the upper cylindrical member 30B contacts with the ball 69 for adjusting interference of engagement between the worm pinion 62 and the worm wheel 54.

A pair of guide rods 39 extend horizontally within the lower cylindrical member 30A of the second housing 30 in a parallel relation to each other. The guide rods 39 support the movable block 70 slidably thereon. A groove 70A which extends perpendicularly to the guide rods is formed in an upper surface of the movable block 70. The eccentric pin 56 is inserted into the groove 70A through a needle bearing assembly 58. A driving pin 72 is provided on a lower surface of the movable block 70.

A stationary block 80 is mounted on an operating rod 20 via a bolt 82 in an upper surface of which a groove 80A is formed which extends perpendicularly to the center line $L_1$ of the operating rod. The driving pin 72 of the movable block 70 engages with the groove 80A through a needle bearing assembly 74.

Figure 3:
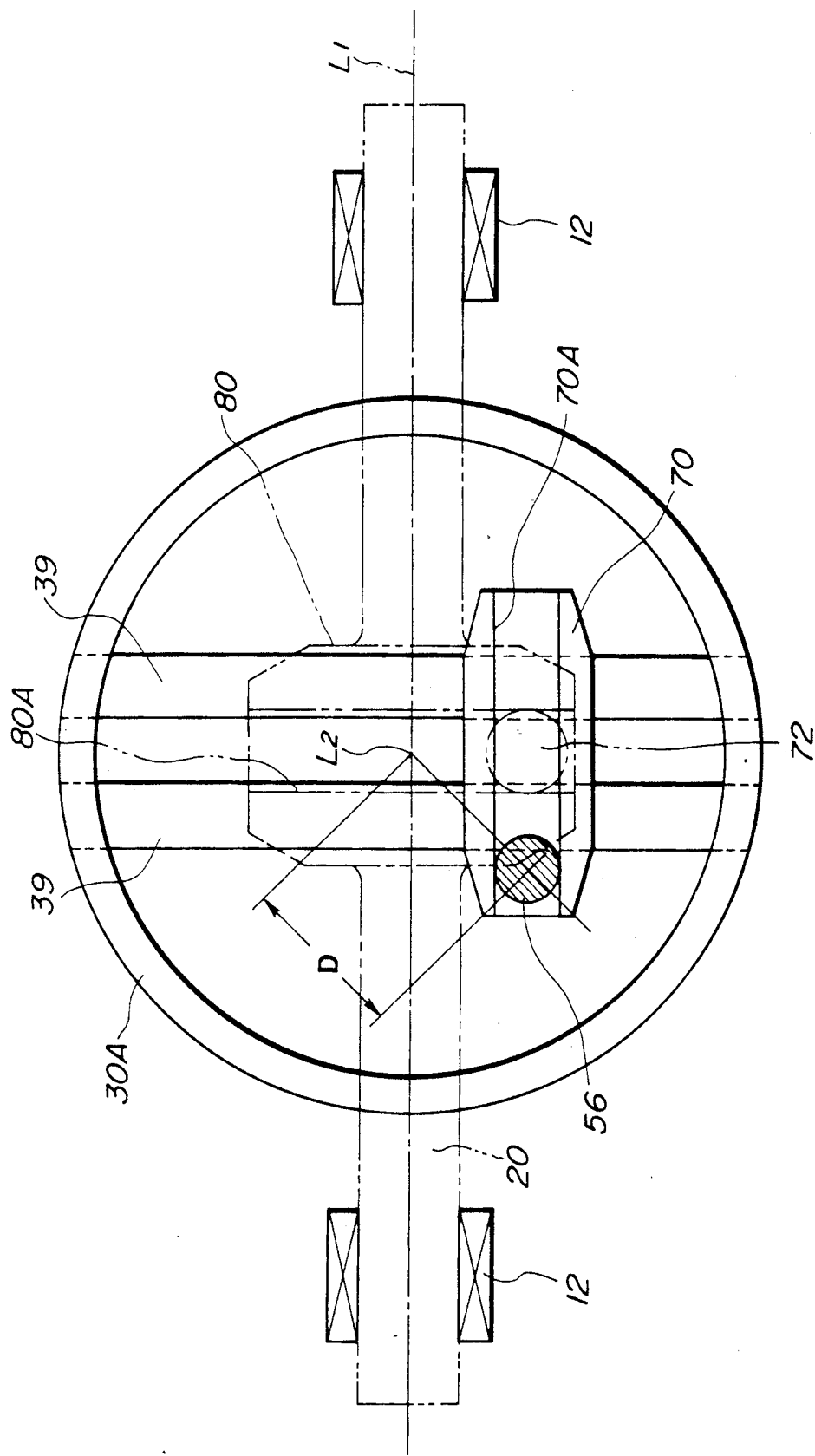
FIGS. 3 to 5 are plan views which show relative movement between a movable block and a stationary block of a steering actuator for providing a desired steering angle for rear wheels.
Figure 4:
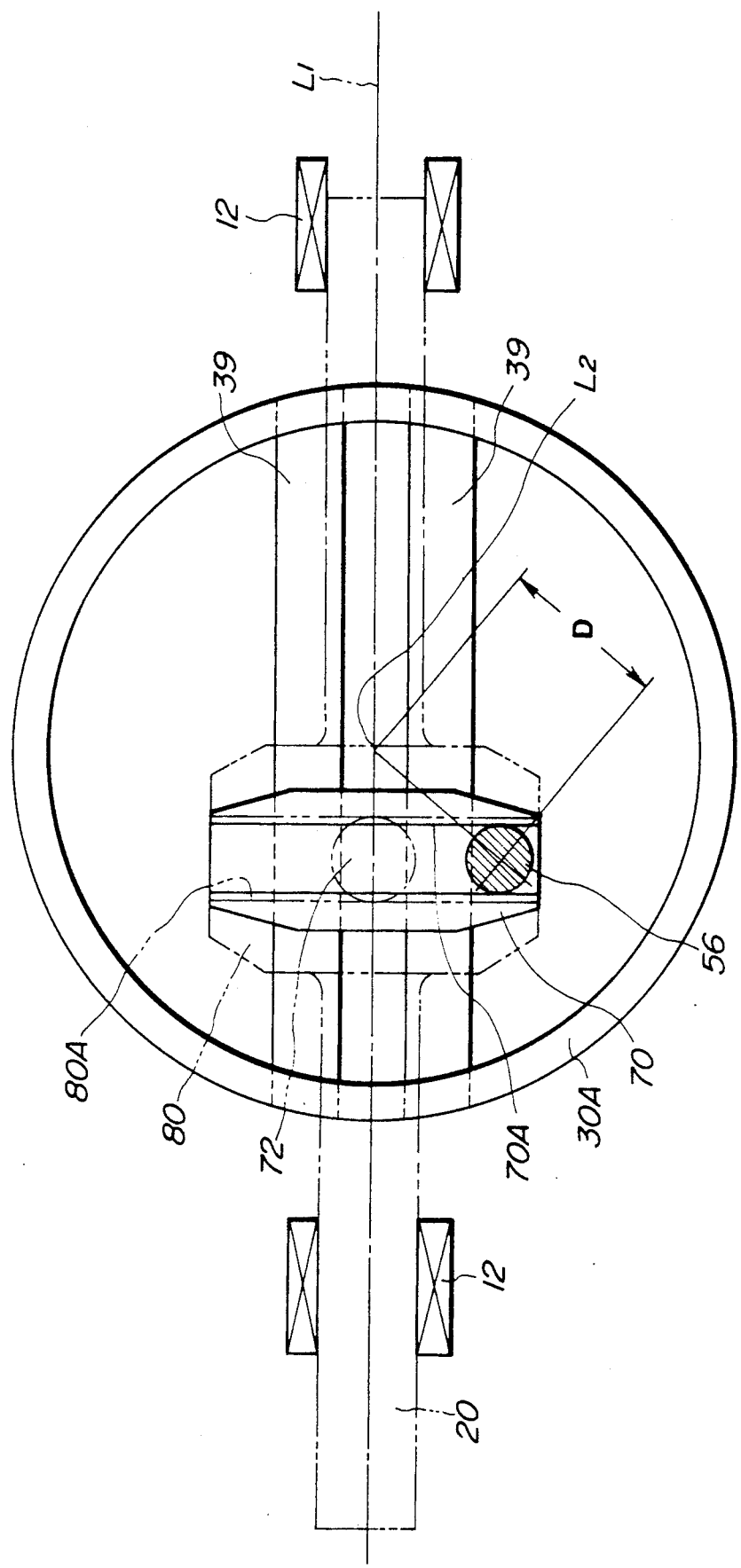
Figure 5:
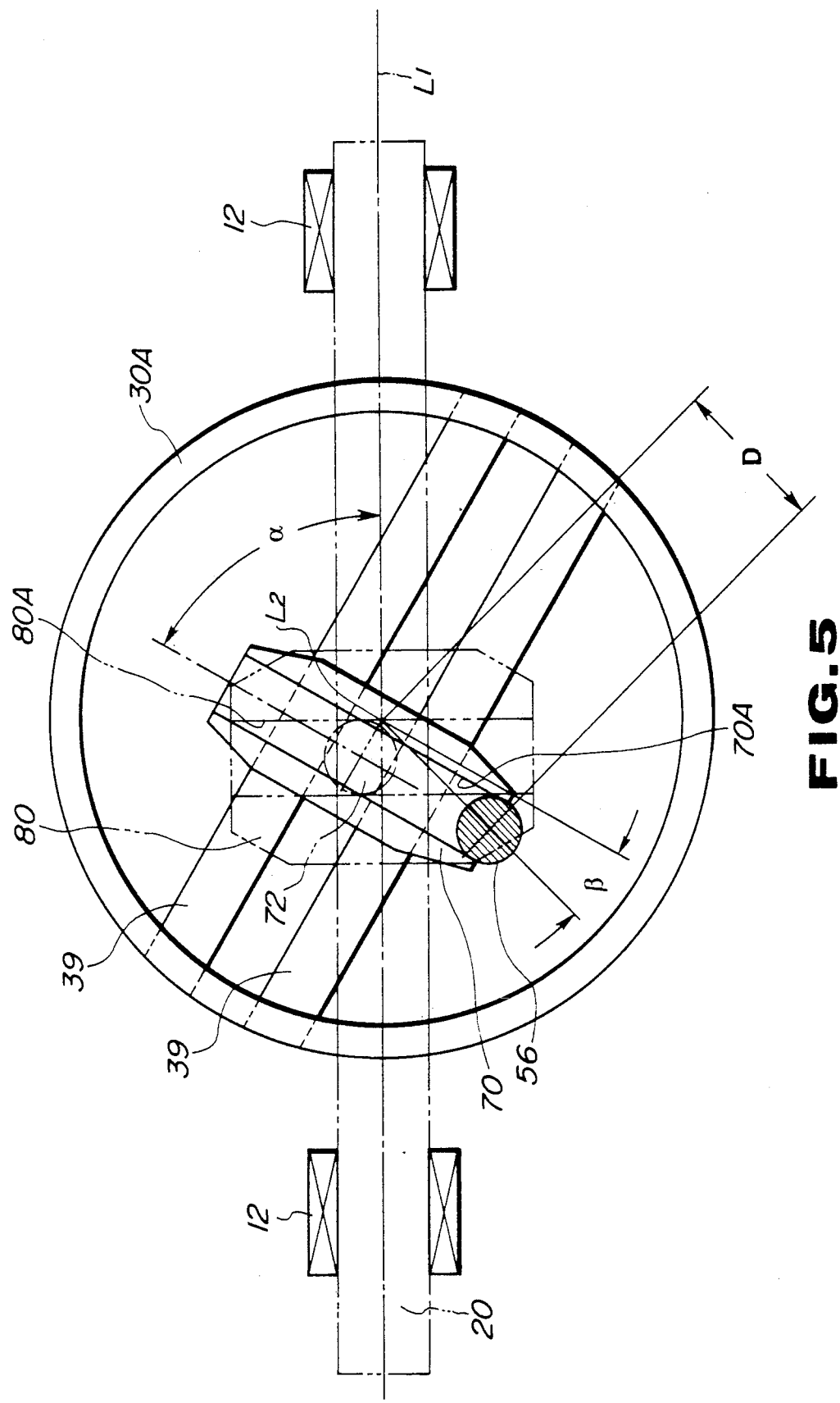

In operation, as shown in FIGS. 3 to 5, rotation of the second motor 40 causes the worm pinion 42 and the worm wheel 36 to rotate the second housing 30 with its lower and upper cylindrical members 30A and 30B, thereby rotating about the center line $L_2$ relative to the first housing 10.

During the relative rotation between the first and second housings 10 and 30, rotation of the worm pinion 62 by the first motor 60 causes the cam shaft 50 to rotate through the worm wheel 54 meshing with the worm pinion 62 about the center line $L_2$ relative to the second housing 30. This rotation causes the eccentric pin 56 provided on the cam shaft 50 to orbit on a circle having a radius D with respect to the center line $L_2$.

As a result of the relative rotation between the first and second housings 10 and 30 by means of the second motor 40, as shown in FIG. 3, when the center line $L_1$ of the operating rod 20 intersects the center lines of the guide rods 39 at a right angle, that is, when the groove 70A of the movable block 70 carried slidably on the guide rods 39 is positioned in a right angle relation to the groove 80A of the stationary block 80 fixed on the operating rod 20, displacement of the movable block 70 along the guide rods 39 resulting from orbiting motion of the eccentric pin 56 is not transmitted to the stationary block 80. It will be appreciated that parallel arrangement between the groove 80A of the stationary block 80 and the guide rods 39 allows the driving pin 72 of the movable block 70 to be displaced along the groove 80A of the stationary block 80 only, resulting in no displacement of the operating rod 20. Therefore, the rear wheels is not steered.

Against the above arrangement, as a result of the relative rotation between the first and second housings 10 and 30, as shown in FIG. 4, when the center line $L_1$ of the operating rod 20 is positioned parallel to the center lines of the guide rods 39, that is, when the groove 70A of the movable block 70 is positioned parallel to the groove 80A of the stationary block 80, displacement of the movable block 70 along the guide rods 39 caused by orbiting motion of the eccentric pin 56 directly acts on the stationary block 80 to move the operating rod 20. It will be appreciated that at a position where the eccentric pin 56 is turned at ninety degrees from the neutral position where the movable and stationary blocks are perpendicular to each other, a maximum stroke D of the operating rod 20 in one direction is attached which corresponds to a degree of eccentricity of the eccentric pin 56 (i.e., the distance D).

Further, as a result of the relative rotation between the first and second housings 10 and 30, as shown in FIG. 5, when the center line $L_1$ of the operating rod 20 is positioned relative to the center lines of the guide rods 39 with a certain angle, that is, when the groove 70A of the movable block 70 is rotated relatively to the groove 80A of the stationary block 80 by an angle $\alpha$ from the neutral position where they are perpendicular to each other (see FIG. 3), displacement of the movable block 70 along the guide rods 39 due to the orbiting motion of the eccentric pin 56 causes the stationary block 80 to move by an angle ratio corresponding to the angle $\alpha$. Therefore, a stroke X of the operating rod 20 in one direction is given by the following relation.

$$X = D \sin \beta \times \sin \alpha$$

where the $\beta$ denotes an angle of the eccentric pin 56 from the neutral position.

It will be noted that a maximum stroke of the operating rod 20, or a steering angle of the rear wheels is mechanically determined dependent upon the angle $\alpha$.

When the rear-wheel steering control is carried out utilizing the previously mentioned steering actuator, it is preferable that a micro-computer is provided which determines a steering angle for the rear wheels based on a steering angle and a steered direction of front wheels monitored by a steering angle sensor and a vehicle speed monitored by a speed sensor. The micro-computer controls the second motor 40 to provide a steering angle for the rear wheels dependent upon the vehicle speed and controls the first motor 60 to provide an angular direction for the rear wheels which is the same phase as a steered angle of the front wheels or an opposite phase. Thus, even if, due to malfunction of control system, the first motor 60 is rotated over a preselected angle, control of the second motor such that a maximum steered angle for the rear wheels, or a displacement of the operating rod 20, is increased according to an increase in the vehicle speed to prevent the rear wheels from over-steering during turns at high speed because a maximum steering angle for the rear wheels is mechanically restricted by the second motor. Additionally, if the control system for the second motor 40 is in service and the control system for the first motor 60 malfunctions, the micro-computer can control the second motor 40 to return the second housing 30 toward a position as shown in FIG. 3 where the movable block 70 is perpendicular to the stationary block 80 causing the operation rod 20 to be not displaced.

While the present invention has been disclosed in terms of the preferred embodiment in order to facilitate better understanding thereof, it should be appreciated that the invention can be embodied in various ways without departing from the principle thereof. Therefore, the invention should be understood to include all possible embodiments and modifications to shown embodiments which can be embodied without departing from the principle of the invention as set out in the appended claims.

What is claimed is:

1. An apparatus for steering wheels of an automotive vehicle comprising:
   first means including an operating rod displaceable along the longitudinal center line thereof for steering the wheels;
   second means including cam means which rotates by a preselected angle for displacing the operating rod in a desired direction; and
   third means, connecting between the cam means and the operating rod, movable along a linear path of travel according to rotation of said cam means for causing the operating rod to be moved by a displacement defined by an angular positional relation between the linear path of travel and the operating rod;
   wherein said third means includes first and second blocks, the first block moving along the linear path of travel according to the rotation of said cam means, the second block transmitting the movement of the first block to the operating rod at a first relative angular position between the linear path of travel and the operating rod and restricting transmission of the movement of the first block to the operating rod at a second relative angular position different from the first relative angular position.

2. An apparatus for steering wheels of an automotive vehicle comprising:
   first means including an operating rod displaceable along the longitudinal center line thereof for steering the wheels;
   second means including cam means which rotates by a preselected angle for displacing the operating rod in a desired direction; and
   third means, connecting between the cam means and the operating rod, movable along a linear path of travel according to rotation of said cam means for causing the operating rod to be moved by a displacement defined by an angular positional relation between the linear path of travel and the operating rod;
   wherein said first and second means are rotatable relative to each other by first driving means, said third means including first and second blocks engagable with each other, the first block moving along a guide rod according to the rotation of said cam means driven by a second driving means, the rod guide defining the linear path of travel which has a variable angular position relative to the operating rod according to the relative rotation between said first and second means, the second block being fixedly attached to the operating rod to restrict relative movement between the first and second blocks at a first angular position between the guide rod and the operating rod to transmit the movement of the first block to the operating rod and allowing said relative movement to block transmission of the movement of the first block to the operating rod at a second angular position different from the first angular position.

3. An apparatus as set forth in claim 2, wherein the second block has a groove extending perpendicular to the operating rod, the first block having a pin which engages slidingly in the the groove of the second block according to the rotation of said cam means at the second angular position where the groove is parallel to the operating rod and which displaces the operating rod according to the rotation of said cam means at the first angular position different from the second angular position.

4. An apparatus for steering rear wheels of an automotive vehicle comprising:
   first means including an operating rod displaceable along the longitudinal center line thereof for steering the rear wheels;
   second means including means which rotates by a preselected direction for displacing the operating rod in a desired direction;
   third means for rotating the cam means by a preselected angle;
   fourth means movable along a linear path of travel provided by said second means according to the rotation of the cam means for converting rotational motion of the cam means into linear motion to move the operating rod by a displacement defined by an angular position between the linear path of travel and the operating rod; and
   fifth means for shifting the angular position between the linear path of travel and the operating rod so as to vary the displacement of the operating rod.

5. An apparatus as set forth in claim 4, wherein said fourth means includes first and second blocks engagable with each other, the first block moving along a guide rod according to the rotation of said cam means, the rod guide defining the linear path of travel which has a variable angular position relative to the operating rod according to relative rotation between said first and second means driven by said fifth means, the second block being fixedly attached to the operating rod to restrict relative movement between the first and second blocks at a first angular position between the guide rod and the operating rod to transmit the movement of the first block to the operating rod and allowing said relative movement to block transmission of the movement of the first block to the operating rod at a second angular position different from the first angular position.

6. An apparatus as set forth in claim 5, wherein the second block as a groove extending perpendicular to the operating rod, the first block having a pin which engages slidingly in the groove of the second block according to the rotation of said cam means at the second angular position where the groove is parallel to the operating rod and which displaces the operating rod according to the rotation of said cam means at the first angular position different from the second angular position.

7. An apparatus for steering rear wheels of an automotive vehicle comprising:
   a first housing in which an operating rod is disposed, slidable along a longitudinal center line thereof for steering the rear wheels;

a second housing in which cam means is provided rotatably for displacing the operating rod in a desired direction;

first driving means for rotating the cam means by a preselected angle;

second driving means for rotating said second housing relative to said first housing according to a vehicle speed; and means for displacing the operating rod according to rotation of the cam means by a distance defined by an angular position between said first and second housings.

8. An apparatus as set forth in claim 7, wherein said means includes first and second blocks engaging with each other, the first block moving along a linear path of travel provided in said second housing according to the rotation of said cam means, the second block being fixedly attached to the operating rod to restrict the movement of the first block along the linear path of travel at a first angular position between the linear path of travel and the operating rod to displace the operating rod and allowing the movement of the first block to block transmission of the movement of the first block to the operating rod at a second angular position different from the first angular position.

9. An apparatus as set forth in claim 8, wherein the second block has a groove extending perpendicular to the operating rod, the first block having a pin which engages slidingly in the the groove of the second block according to the rotation of said cam means at the second angular position where the groove is parallel to the operating rod and which displaces the operating rod according to the rotation of said cam means at the first angular position different from the second angular position.

10. An apparatus for steering wheels of an automotive vehicle comprising:

first means including an operating rod displaceable along the longitudinal center line thereof for steering the wheels;

second means including cam means which rotates by a preselected angle for displacing the operating rod in a desired direction;

third means, connecting between the cam means and the operating rod, movable along a linear path of travel according to rotation of said cam means for causing the operating rod to be moved by a displacement defined by an angular positional relation between the linear path of travel and the operating rod; and fourth means for changing said angular positional relation to vary the displacement of the operating rod.

* * * * *